(12) United States Patent
Hikawa

(10) Patent No.: US 6,678,065 B1
(45) Date of Patent: Jan. 13, 2004

(54) IMAGE FORMING APPARATUS AND CONTROL METHOD THEREOF

(75) Inventor: Yuji Hikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/227,570

(22) Filed: Jan. 8, 1999

(30) Foreign Application Priority Data

Jan. 9, 1998 (JP) .......................................... 10-003155

(51) Int. Cl.[7] .............................................. G06F 15/00
(52) U.S. Cl. ..................... 358/1.13; 358/1.15; 358/1.16; 358/468
(58) Field of Search ................................ 358/468, 1.13, 358/1.15, 1.1, 1.16, 404, 403, 401, 434, 448

(56) References Cited

U.S. PATENT DOCUMENTS

| | | | | |
|---|---|---|---|---|
| 5,491,694 A | * | 2/1996 | Oliver et al. ............... | 370/85.4 |
| 5,511,150 A | * | 4/1996 | Beaudet et al. ............ | 358/1.14 |
| 5,519,499 A | * | 5/1996 | Saito .......................... | 358/296 |
| 5,627,658 A | * | 5/1997 | Connors et al. ............ | 358/407 |
| 5,754,745 A | * | 5/1998 | Sato ........................... | 395/113 |
| 5,774,356 A | * | 6/1998 | Hisatake et al. ............ | 364/148 |
| 5,907,410 A | * | 5/1999 | Ohtake ....................... | 358/468 |
| 5,920,405 A | * | 7/1999 | McIntyre et al. ........... | 358/442 |
| 6,130,757 A | * | 10/2000 | Yoshida et al. ............ | 358/1.15 |
| 6,219,669 B1 | * | 4/2001 | Haff et al. .................... | 707/10 |
| 6,271,927 B1 | * | 8/2001 | Kohtqani et al. .......... | 358/1.16 |
| 6,353,844 B1 | * | 3/2002 | Bitar et al. ................. | 709/102 |

FOREIGN PATENT DOCUMENTS

JP          6-350772          12/1994

* cited by examiner

*Primary Examiner*—Mark Wallerson
(74) *Attorney, Agent, or Firm*—Finnegan, Henderson, Farabow, Garrett & Dunner LLP

(57) ABSTRACT

In an image forming apparatus, the minimum amount of resources required to execute jobs is registered for each job type in a required-amount-of-resources management table. In response to a request from a job control section, a resource management section dynamically changes the amount of resources to be allocated to a job at the time of execution of the job, so as to correspond to the priority of the job.

12 Claims, 8 Drawing Sheets

| NO. | JOB NAME | JOB CONSTITUENT ELEMENT | MINIMUM REQUIRED AMOUNT |
|---|---|---|---|
| 1 | SCANNED DATA STORAGE | IIT CONTROL SECTION | 1 |
| | | HDD CONTROL SECTION | 1 PARTITION |
| | | MEMORY CONTROL SECTION | 1 PAGE |
| 2 | STORED DATA PRINT | HDD CONTROL SECTION | 1 PARTITION |
| | | IOT CONTROL SECTION | 1 |
| | | MEMORY CONTROL SECTION | 1/2 PAGE |
| 3 | NET RECEIVED DATA DECOMPOSITION | NETWORK CONTROL SECTION | 1 SESSION/PROTOCOL |
| | | DECOMPOSER CONTROL SECTION | 1PDL |
| | | MEMORY CONTROL SECTION | 64KB |
| 4 | DECOMPOSED DATA STORAGE | DECOMPOSER CONTROL SECTION | 1PDL |
| | | HDD CONTROL SECTION | 1 PARTITION |
| | | MEMORY CONTROL SECTION | 1 PAGE |
| 5 | RECEIVED FAX DATA STORAGE | FAX CONTROL SECTION | 1 LINE (G3/G4) |
| | | HDD CONTROL SECTION | 1 PARTITION |
| | | MEMORY CONTROL SECTION | 2 BLOCKS |
| 6 | STORED DATA FAX TRANSMISSION | HDD CONTROL SECTION | 1 PARTITION |
| | | FAX CONTROL SECTION | 1 LINE (G3/G4) |
| | | MEMORY CONTROL SECTION | 2 BLOCKS |
| 7 | STORED DATA NET COMMUNICATION | HDD CONTROL SECTION | 1 PARTITION |
| | | NETWORK CONTROL SECTION | 1 SESSION/PROTOCOL |
| | | MEMORY CONTROL SECTION | 64KB |
| 8 | MEMORY COPY | NO. 1 | NO. 1X1 |
| | | NO. 2 | NO. 2X1 |
| 9 | NETWORK PRINT | NO. 3 | NO. 3X1 |
| | | NO. 4 | NO. 4X1 |
| | | NO. 2 | NO. 2X1 |
| 10 | FAX BROADCAST COMMUNICATION (N STATIONS) | NO. 1 | NO. 1X1 |
| | | NO. 6 | NO. 6XN |
| 11 | ... | ... | ... |
| 12 | ... | ... | ... |

*FIG. 4*

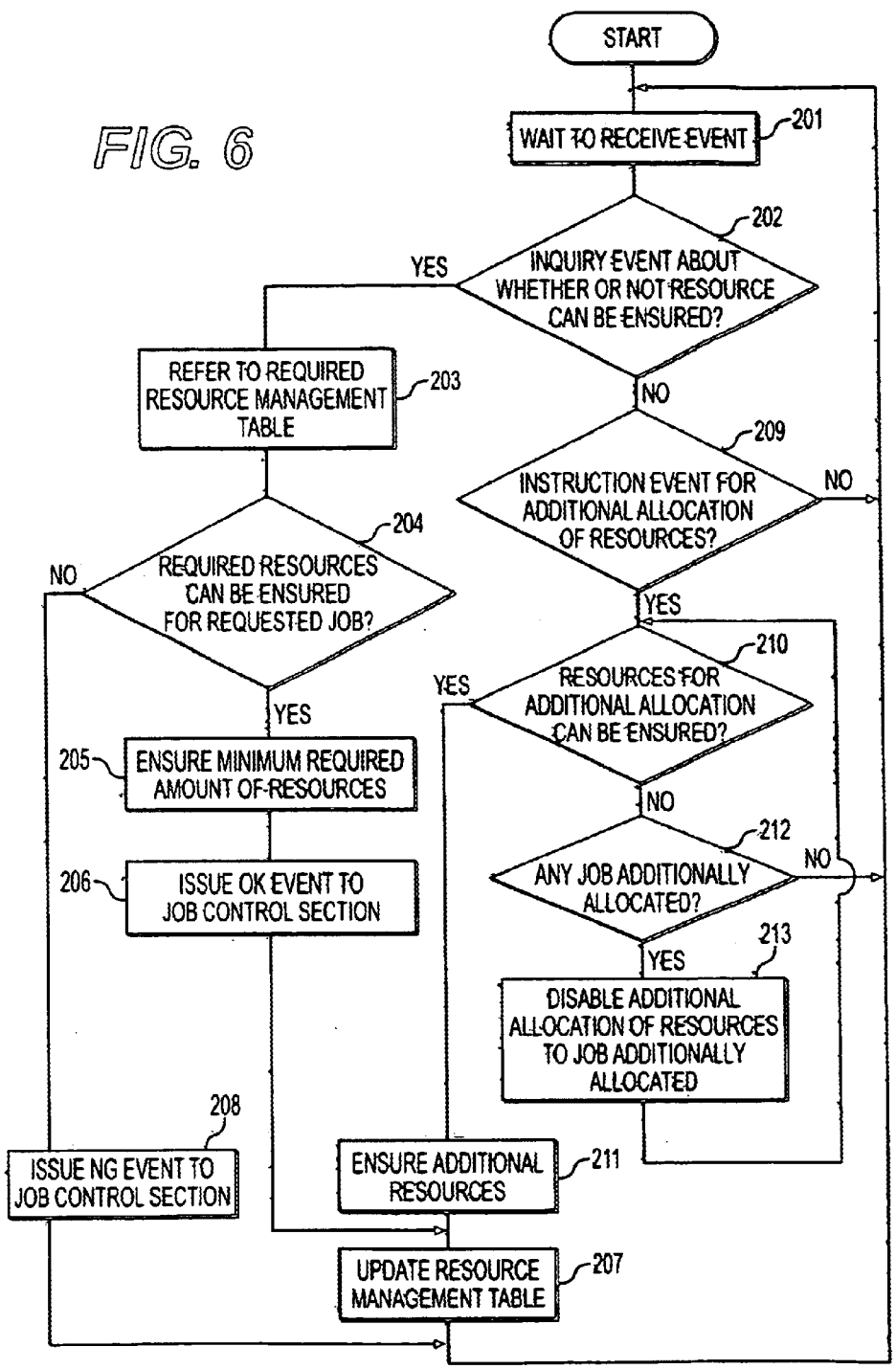

| RESOURCE NAME | RESOURCE CAPACITY (UNIT) | AVAILABLE CAPACITY (UNIT) | JOB-IN-PROGRESS ID (UNIT OF USE) |
|---|---|---|---|
| MEMORY CONTROL SECTION | 128(MB) | 64(MB) | JOB ID=24(32MB) |
| | 32(PAGES) | 16(PAGES) | JOB ID=18(32MB) |
| | 2048(BLOCKS) | 1024(BLOCKS) | |
| HDD CONTROL SECTION | 2(GB) | 1.5(GB) | JOB ID=24(0.5GB) |
| | 16(PARTITIONS) | 12(PARTITIONS) | JOB ID=18(0MB) |
| IIT CONTROL SECTION | 1(UNIT OF USE) | 0(UNIT OF USE) | JOB ID=24(UNIT OF USE) |
| FAX LINE CONTROL SECTION | 2(G3LINE) + 2(G4LINE) | 2(G3LINE) + 2(G4LINE) | |
| NETWORK CONTROL SECTION | 12(SESSIONS) | 12(SESSIONS) | |
| | 4(TCP/IP) + 4(IPX/SPX) + 4(ETHERTALK) | 4(TCP/IP) + 4(IPX/SPX) + 4(ETHERTALK) | |
| DECOMPOSER CONTROL SECTION | 1(POSTSCRIPT) + 1(PCL) + 1(ART) | 1(POSTSCRIPT) + 1(PCL) + 1(ART) | |
| IOT CONTROL SECTION | 3(UNIT OF USE) | 2(UNIT OF USE) | JOB ID=18(UNIT OF USE) |

*FIG. 7*

| NO. | JOB NAME | NUMBER OF TIMES OF EXECUTION | PRIORITY | | |
|---|---|---|---|---|---|
| | | | 7:00-21:59 | 22:00-6:59 | DEFAULT |
| 1 | SCANNED DATA STORAGE | 632 | 3 | 3 | 3 |
| 2 | STORED DATA PRINT | 3410 | 1 | 3 | 1 |
| 3 | NET RECEIVED DATA DECOMPOSITION | 1738 | 2 | 3 | 2 |
| 4 | DECOMPOSED DATA STORAGE | 1735 | 2 | 3 | 2 |
| 5 | RECIEVED FAX DATA STORAGE | 132 | 4 | 1 | 4 |
| 6 | STORED DATA FAX TRANSMISSION | 216 | 5 | 1 | 5 |
| 7 | STORED DATA NET COMMUNICATION | 89 | 6 | 1 | 6 |
| 8 | MEMORY COPY | 402 | 2 | 4 | 2 |
| 9 | NETWORK PRINT | 1518 | 1 | 3 | 1 |
| 10 | FAX BROADCAST COMMUNICATION (N STATIONS) | 6 | 3 | 1 | 3 |
| 11 | ... | | | | |
| 12 | ... | | | | |

*FIG. 8*

IMAGE FORMING APPARATUS AND CONTROL METHOD THEREOF

BACKGROUND OF THE INVENTION

1. Field of the Invention

The present invention relates to an image forming apparatus and a control method thereof, and more particularly, to an image forming apparatus which enables an improvement in the efficient execution of jobs by appropriate and dynamic distribution of resources, such as memories or disks, when there is performed a concurrent operation in which a plurality of types of jobs are executed concurrently, as well as to a control method thereof.

2. Description of the Related Art

When installed in an office or the like, a multi-function machine (hereinafter abbreviated to an "MF machine") which fulfils a plurality of functions, such as a copy function, a scanner function, a printer function, and a facsimile function, is usually shared among a plurality of users. In such a case, a certain user uses the MF machine as a network printer, and another user uses the MF machine as a copier. Requests for offer of various functions (i.e., job requests) from a plurality of users may simultaneously concentrate on such an MF machine shared among a plurality of users. Under such a condition, a conventional image forming apparatus having multiple functions has employed a method of time-sequentially processing a plurality of job requests.

The job concentration is attributable to contention for shared resources within the imaging forming apparatus which are required for executing a plurality of job requests that arise simultaneously. The shared resources include image reading means (hereinafter referred to as an "image input terminal" or "IIT"), image output means (hereinafter referred to as an "image output terminal" or "IOT"), memory, secondary storage means such as a hard disk, a document feeder, a sorter, a finisher, and the like.

Under the method by which a plurality of job requests are processed time-sequentially, a plurality of users cannot utilize the functions of the MF machine at one time. For this reason, when a specific job is being executed, another job must wait for execution. In such a case, an urgent network print job requested by a certain user, for example, may wait until there is executed another not-so-urgent job, such as receipt of a facsimile transmittal or a direct mail or a print job.

To solve such a problem, a digital copier system disclosed in, e.g., Japanese Patent Unexamined Publication No. Hei. 6-350772, is configured in such a way as to determine the sequence of use of shared resources according to a predetermined order of precedence, to enable a user to set the order of precedence according to the types of jobs, or to concurrently process a plurality of jobs by allowing alternative use of shared resources, in a case where a plurality of types of job request arise simultaneously. By employment of such a processing scheme, the user prioritizes a plurality of job requests by assigning a high priority to an urgent job request beforehand or by imparting the right to use the shared resources alternately to the jobs assigned the same priority, thereby greatly improving the operability of the digital copier system.

In the digital copier system disclosed in Japanese Patent Unexamined Publication No. Hei. 6-350772, since the order in which jobs are executed is defined according to the preset sequence of preference, lower priority jobs are eventually brought into a wait state. For example, since a job of printing only one page is of lower priority, the job may be brought into a wait state for a long period of time until completion of a higher priority job having a necessity of printing a document of fifty pages, such as receipt of a facsimile transmittal or a print job.

SUMMARY OF THE INVENTION

An object of the present invention is to provide an image forming apparatus which can provide improved operability to individual users by appropriately distributing resources even when a plurality of job requests arise simultaneously, as well as to provide a control method thereof.

To achieve the above object, according to a first aspect of the present invention, there is provided an image forming apparatus for concurrently executing a plurality of types of jobs through use of shared resources, the apparatus comprising: job control means for controlling execution of a job; and resource management means for managing a state of use of the shared resources and allocating the shared resources required for executing the job in response to a request from the job control means when the job control means executes the job.

According to a second aspect of the present invention, there is provided an image forming apparatus for concurrently executing a plurality of types of jobs, the apparatus comprising: job priority determination means for determining priorities of the jobs.

According to a third aspect of the present invention, there is provided a method of controlling an image forming apparatus for concurrently executing a plurality of types of jobs through use of shared resources, wherein shared resources required for executing a job are allocated at the time of execution of the job by management of state of use of the shared resources.

BRIEF DESCRIPTION OF THE DRAWINGS

FIG. 4 is a table showing the details of an example of contents of a required-amount-of-resources management table;

FIG. 6 is a flowchart showing the flow of operations of a resource management section when the management section receives an event issued from the job control section;

FIG. 7 is a table showing the details of an example of contents of a required resource management table; and FIG. 8 is a table showing the details of an example of contents of a job type management table.

DETAILED DESCRIPTION OF THE PREFERRED EMBODIMENTS

An image forming apparatus and a control method thereof according to an embodiment of the present invention will be described in detail with reference to the accompanying drawings.

Figure 1:
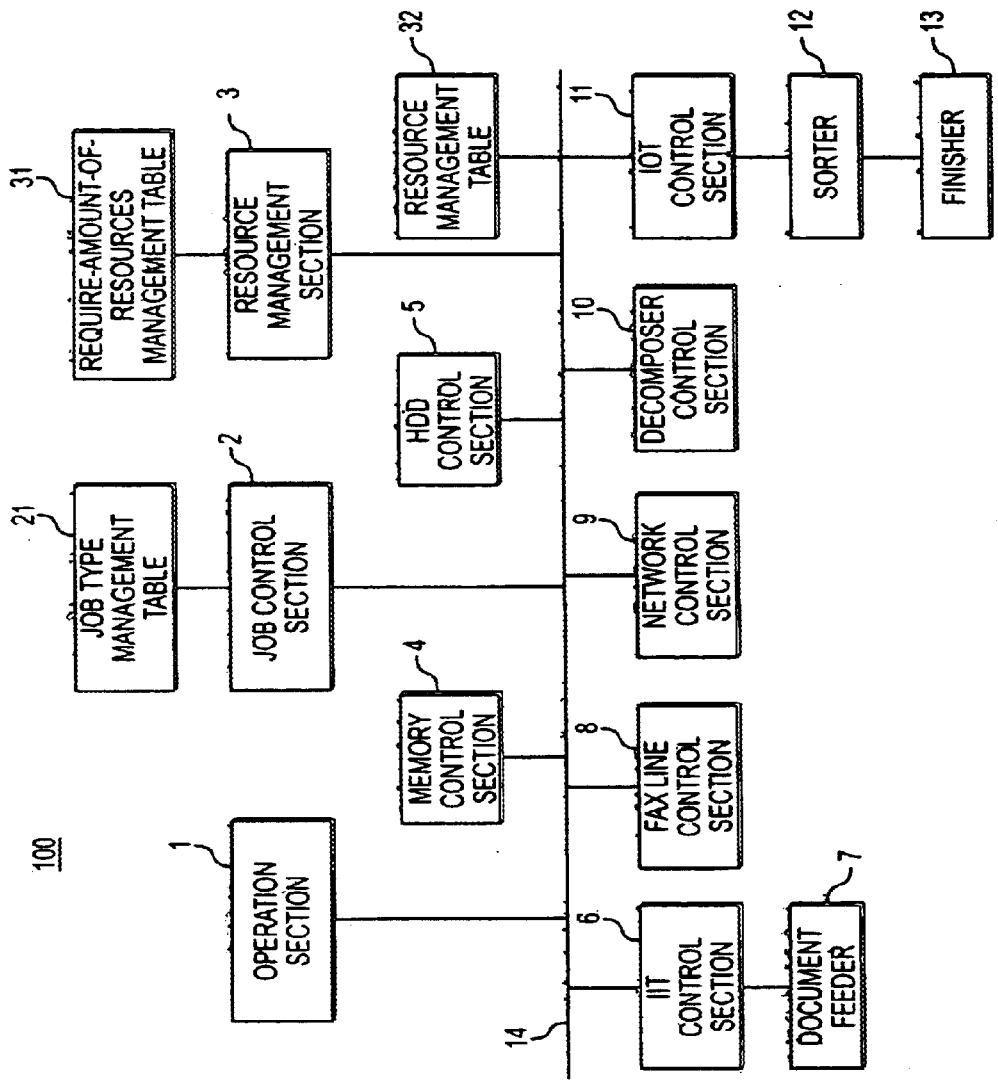
FIG. 1 is a block diagram showing the configuration of an image forming apparatus according to the present invention.

FIG. 1 is a block diagram showing the configuration of an image forming apparatus according to the present invention.

As shown in FIG. 1, an image forming apparatus 100 comprises an operation section 1; a job control section 2; a resource management section 3; a memory control section 4; an HDD control section 5; an IIT control section 6; a document feeder 7; a FAX line control section 8; a network control section 9; a decomposer control section 10; an IOT control section 11; a sorter 12; and a finisher 13. These components are connected together by means of a system bus 14.

In the image forming apparatus 100, the components assigned reference numerals 4 through 13 are called resources.

The operation section 1 receives an operation from the user such as a job request and indicates the operational status of the image forming apparatus 100. The job control section 2 receives the job request entered by way of the operation section 1, controls execution of a plurality of jobs, has a job type management table 21 for managing various types of information accordion to the type of the job, and registers and manages the number of times various jobs are executed and the priorities of the jobs. The resource management section 3 has a required-amount-of-resources management table 31 which registers and manages the type of and the minimum amount of individual resources (indicated by reference numerals 4 through 13) required for executing jobs within the image forming apparatus, with regard to each of the plurality of types of jobs registered in and managed by the job type management table 21. The resource management section 3 also has a resource management table for managing the type of and the amount of resource used by the job that is being executed.

Next, each type of resources assigned reference numerals 4 through 13 will be described.

The memory control section 4 controls a memory device such as a DRAM. When image data are exchanged among resources, the memory control section 4 allocates a specific location of a memory device, i.e., page memory, band buffer memory, and block memory, to each resource, as required. When the use of the memory location assigned to the resource is completed, the allocated memory location is returned to the memory control section 4. The memory control section 4 clears the data stored in the memory location so that the memory location can be re-assigned to another resource.

The HDD control section 5 controls a secondary storage medium such as a hard disk drive (HDD) and stores the image data captured by the image forming apparatus 100 into the HDD. The HDD control section 5 compresses and stores the image data written into a specific memory location and writes the stored image data into a specific memory location assigned by the memory control section 4 by expansion of the stored image data.

The IIT control section 6 reads information from the original by controlling a scanner and by actuating a device such as a charge-coupled device. The thus read document information is digitized and written into the specific memory location assigned by the memory control section 4. The IIT control section 6 is connected to the document feeder 7, as necessary, and controls conveyance, to the scanner, of the original of many pages to be read.

The FAX line control section 8 is connected to a public network and transmits and receives image data to and from a remote facsimile machine through use of the G3/G4 protocol. The FAX line control section 8 writes the received image data into the specific memory location assigned by the memory control section 4 and transmits the image data written into the specific memory location to another facsimile machine connected to the public network.

The network control section 9 is connected to a network such as a LAN and transmits and receives image data or control data to and from a host compute connected to the LAN. Through use of one or more types of network protocols, the network control section 9 receives from the host computer print data, such as PDL, and an image data file described in the format of JPEG/TIFF/GIF, writes the thus received data or file into the specific memory location assigned by the memory control section 4, and transmits the image data written into the specific memory location to the host computer by describing the image data in the form of a file in a specific format.

The decomposer control section 10 converts the print data, such as PDL, written into the specific memory location into image data through use of one or more decomposers/emulators and writes the thus converted image data into the specific memory location assigned by the memory control section 4.

The IOT control section 11 controls an image output terminal and prints on paper the image data written into the specific memory location. The sorter 12 or the finisher 13 is connected to the IOT control section 11, as required, thereby controlling various operations, such as sorting of a plurality of pages of printed paper and stapling or punching or folding of sorted sheets.

The resources 4 through 13 exchange image data through the memory assigned to the resources by the memory control section 4. By use of such a configuration, various jobs requested by the user can be implemented by combination of various resources. For example, a memory copy job is composed of two jobs: that is, a scanned data storage job to be implemented by a combination of the IIT control section 6, the HDD control section 5, and the memory control section 4, and a stored data print job to be implemented by a combination of the HDD control section 5, the IOT control section 11, and the memory control section 4.

Figure 2:
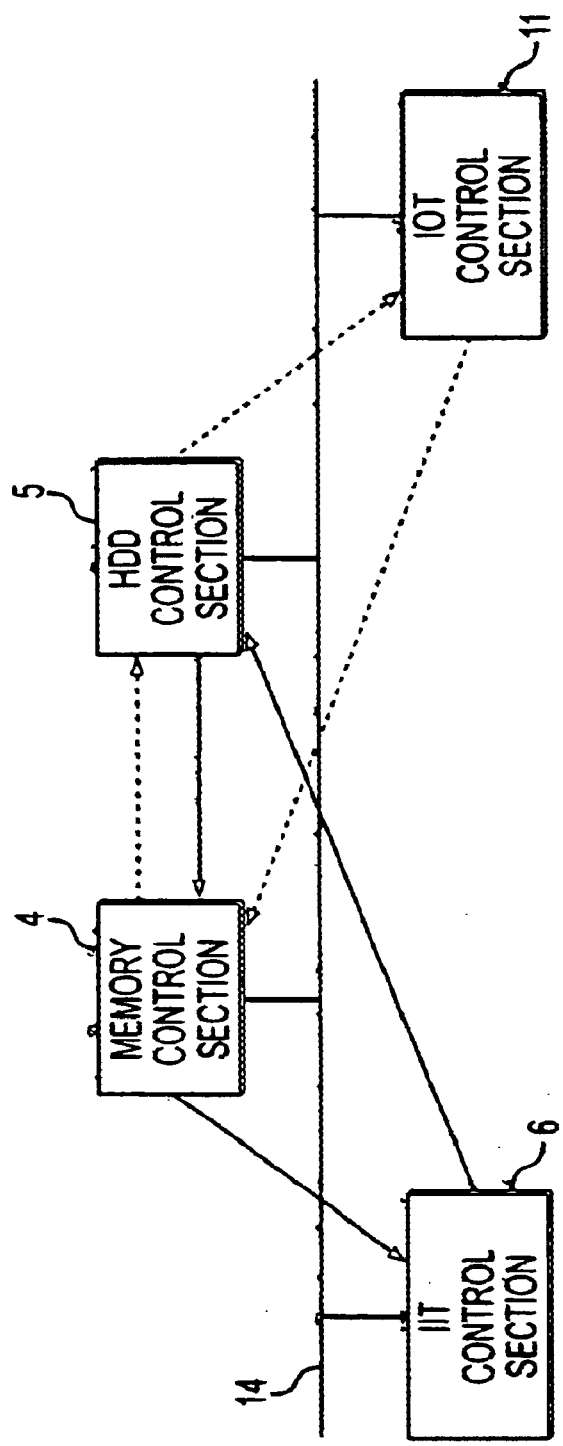
FIG. 2 is a flowchart showing the flow of image data at the time of execution of a memory copy job.

FIG. 2 shows the flow of image data in the case of execution of a memory copy job.

In FIG. 2, the flow of image data indicated by a solid arrow represents the flow of a scanned data storage job. The IIT control section 6 sends to the memory control section 4 a request for page memory equating in volume to one page of the job in order to write the image data regarding the original read by means of the scanner. The image data captured through scanning of the original are written into the specific memory location assigned. The thus written memory location is handed over to the HDD control section 5. The IIT control section 6 sends to the memory control section 4 another request for assignment of new page memory required for reading an image of the next original document. The HDD control section 5 compresses the image data, which is received from the IIT control section 6 and written into the memory location, and stores the thus compressed image data into the HDD. After completion of storage of the compressed image data, the memory location in which the image data have been written is returned to the memory control section 4. The image data regarding a plurality of pages of the original can be stored in the HDD through repeated execution of the foregoing operations.

The flow of image data indicated by a broken arrow in FIG. 2 represents the flow of a storage data print job. The HDD control section 5 sends to the memory control section 4 allocation of page memory required for storing the image data that are stored in the HDD as a result of the scanned data storage job. The image data are read from the HDD in the order in which the data are to be printed while being expanded on a per-page basis, and the thus read image data are written into the memory location allocated to the scanned data storage job. The memory location in which the expanded image data are written is handed over to the IOT control section 11. The HDD control section 5 sends to the memory control section 4 a request for another new page memory required for reading the next image data. The IOT control section 11 performs print processing on the basis of the image data written into the memory location received from the HDD control section 5. After completion of the printing operation, the memory location in which the image data are written is returned to the memory control section 4. The image data regarding a plurality of pages of the original stored in the HDD can be printed.

In the case of the memory copy job including the scanned data storage job and the stored data print job, as indicated by combination of the solid arrow and the broken arrow shown in FIG. 2, requesting (ensuring) and releasing of a memory location required for passing image data among the resources are repeatedly performed. At this time, if memory equating in volume to one page of the job can be ensured for the scanned data storage job and the stored data print job, respectively, the loops formed respectively by the solid line and the broken line can be maintained, whereby the jobs can be continuously executed.

However, provided that only the memory equating in volume to one page of the job is ensured in total for the two types of jobs, it is considered that, when the stored data print job is executed during execution of the scanned data storage job, the jobs compete for use of the memory equating in volume to one page of the job, thereby making it difficult to ensure an effective execution speed or rendering the system operations unstable, which would otherwise be caused by a deadlock due to resource (or memory) depletion.

Conversely, provided that page memory corresponding in volume to two or more pages of the original is ensured for each of the jobs, the HDD control section 5 and the IIT control section 6 which request memory locations can ensure one new page memory location after another without awaiting release of the page memory from the HDD control section 5 and the IOT control section 11, thereby increasing the speed at which the jobs are executed. The overall throughput of the memory copy job is improved.

Figure 3:
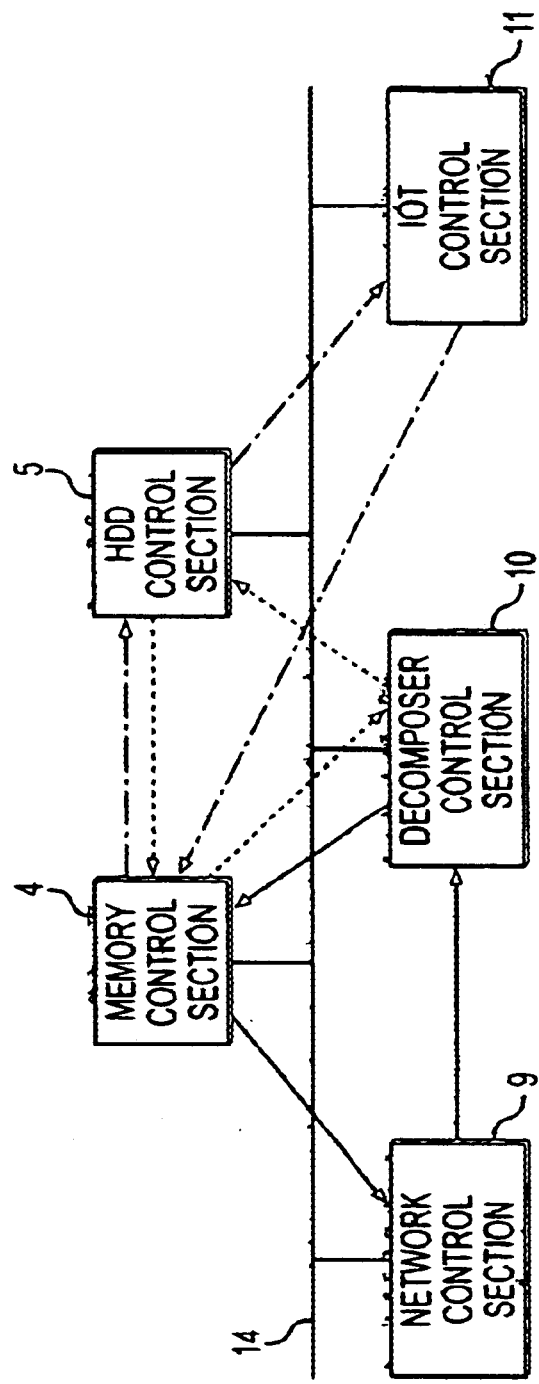
FIG. 3 is a flowchart showing the flow of image data at the time of execution of a network print job.

FIG. 3 shows the flow of image data at the time of execution of a network print job according to another example of the present invention.

The network print job comprises three loops: namely, a net received data decomposition job indicated by a solid arrow; a decomposed data storage job indicated by a broken arrow; and a stored data print job indicated by a one-dot chain line. In the net received data decomposition job, the network control section 9 sends to the memory control section 4 a request for page memory equating in volume to one page of the job in order to write the print data, such as PDL, received from the host computer by way of the network. The network control section 9 writes the thus received print data into the specific memory location allocated to the net received data decomposition job. The memory location in which the print data are written is handed over to the decomposer 10. In order to receive the next print data, the network control section 9 sends to the memory control section 4 a request for another new page memory location. The decomposer 10 converts into image data the print data that are written into the memory location received from the network control section 9 and, after completion of conversion, returns to the memory control section 4 the memory location in which the print data are written.

In the decomposed data storage job, the decomposer control section 10 sends to the memory control section 4 a request for page memory equating in volume to one page of the job in order to write the thus converted image data. The thus converted image data are written into the specific memory location. The memory location in which the converted image data are written is handed over to the HDD control section 5. The decomposer control section 10 sends to the memory control section 4 a request for another new memory location in order to convert the next print data. On the other hand, the HDD control section 5 compresses the image data written in the memory location received from the decomposer control section and stores the thus compressed image data into the HDD. After completion of storage of the compressed image data, the memory location in which the image data are written is returned to the memory control section 4. The stored data print job is executed in the same manner as the previously described memory copy job, and hence its explanation will be omitted here.

Even in this case, each loop requires the minimum amount of memory. If the amount of ensured memory is smaller than the minimum amount of memory, jobs cannot be carried out concurrently.

For this reason, in order to execute a specific type of job, the minimum amount of resources can be specified beforehand. If a request for a certain type of job is received from the user, and the minimum required amount of resources cannot be ensured, execution of that job must be disabled. Conversely, if the minimum required amount of resources can be ensured, a plurality of jobs can be executed concurrently.

In the foregoing case, the minimum required amount of resources corresponds to page memory equal to one page of each job. However, the amount of resources can be changed depending on another resource of the image forming apparatus 100, e.g., hardware specifications, such as the operating speed of the scanner or the image output terminal, the read/write speed of the HDD, the operating speed of memory, and the DMA transfer rate, and system specifications such as the tolerance limit specification required for stable system operations. Although the minimum required amount of resources does not always assume a specific value for each type of job, the amount of resources can be calculated on the basis of the foregoing parameters.

These values are registered for each type of job in the required-amount-of-resources management table 31 beforehand.

FIG. 4 shows the details of contents of the required-amount-of-resources management table 31.

In the required-amount-of-resources management table 31 there are registered job constituent elements and the minimum required amount of resources for each type of job. The resources required by the jobs are provided as the job constituent elements for each type of job. A value which has been calculated beforehand is registered as the minimum required amount of each resource.

For example, scanned data storage job No.1 can be executed only on condition that the IIT control section 6 ensures a disk space equivalent to one unit operation; that the HDD control section 7 ensures a disk space equivalent to one partition; and that the memory control section 4 offers page memory equivalent to one page of the job.

Jobs No. 8 through No. 10 require jobs No. 1 through No. 7 as job constituent elements. The minimum required amount of resources corresponds to a multiple of the amount of resources required by each job. For instance, memory copy job No. 8 requires two types of jobs, i.e., jobs No. 1 and No. 2, as constituent elements (or virtual resources). The minimum amount of resources required by job No. 8 corresponds to a total amount of the minimum amount of resources required by job No. 1 and the minimum amount of resources required by job No. 2.

The resource management section 3 decides from the minimum required amount of resources registered in the required-amount-of-resources management table 31 whether or not the required amount of resources can be ensured.

Description will now be given of internal operations of the job control section 2 and the resource management section 3 required to determine whether or not jobs are executed concurrently at the time of a job request, through use of the required-amount-of-resources management table 31.

Figure 5:
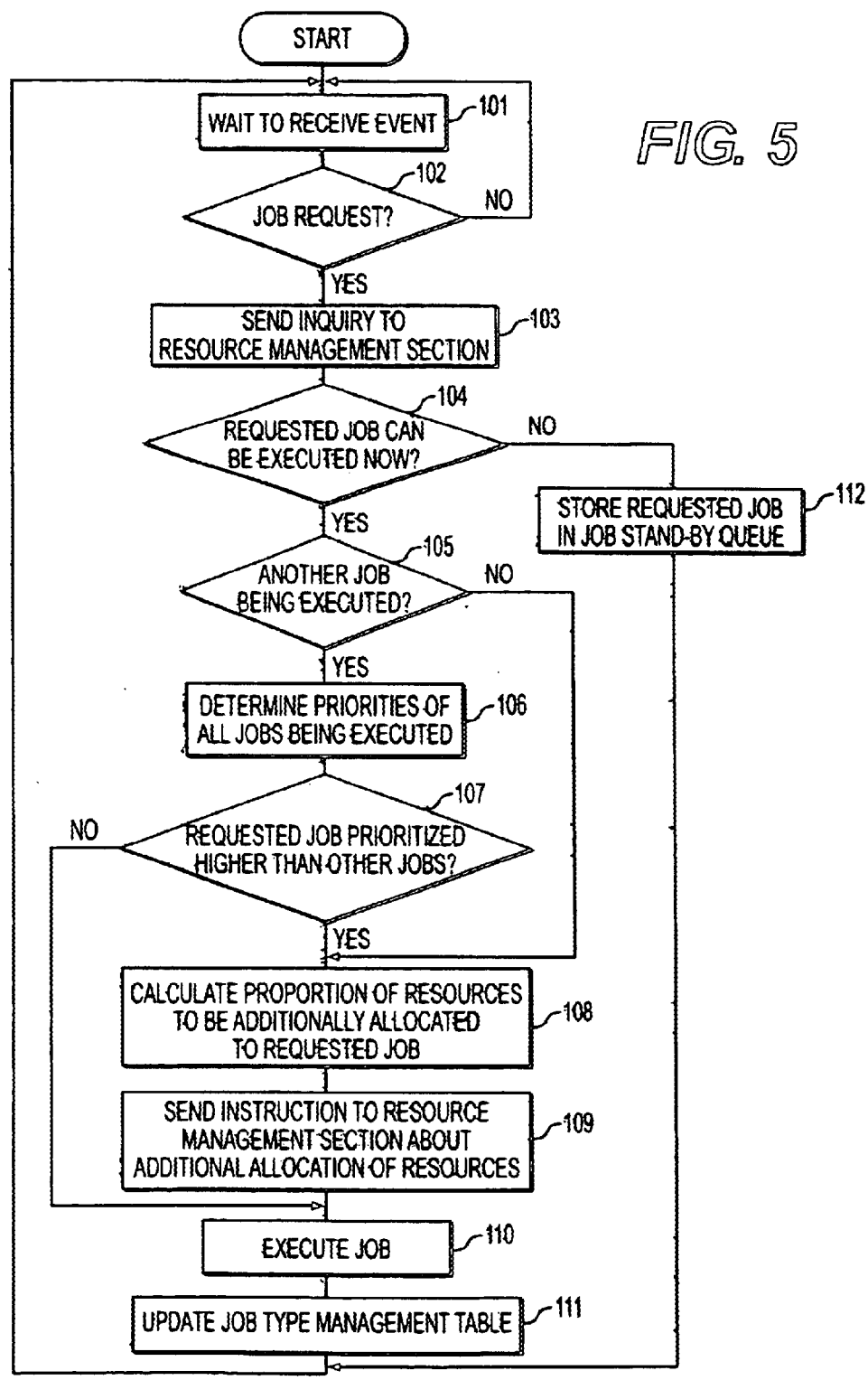
FIG. 5 is a flowchart showing the flow of internal operations of a job control section.

FIG. 5 shows the flowchart of internal operations of the job control section 2.

The flowchart shows the flow of operations performed by the job control section 2 particularly when the section receives a job request event. In the following description, event communication is established among the operation section 1, the job control section 2, the resource management section 3, and the like. The event communication essentially employs message communication used for communication among tasks of the multi-task operating system.

The job control section 2 awaits a job request event entered by way of the operation section 1 (step 101). When the job control section 2 receives some type of event (step 102), and when it turns out that the received event is a job request event (YES in step 102), the job request control section 2 sends to the resource management section 3 an inquiry about whether or not the resource management section 3 can execute the requested job; namely, whether or not the resource management section 3 can ensure the minimum amount of resources required for executing the requested job (step 103).

As a result, if it is determined that the resource management section 3 can execute the job (description will be given later of the operations performed by the resource management section 3 in order to determine whether or not the minimum amount of resources can be ensured), it is checked whether or not another job is being executed (step 105). If another job is being executed (YES in step 105), the priorities of all the jobs including the requested job are determined (step 106)

If it is determined that the requested job is prioritized higher than the other jobs or if it is determined in step 105 that no another job is being executed (NO in step 105), there is calculated an additional allocation proportion used for additionally allocating resources to the requested job (step 108). An instruction event is issued so as to cause the resource management section 3 to additionally allocate resources to the requested job on the basis of the thus calculated additional allocation proportion (step 109).

Execution of the job is commenced (step 110), and the data regarding the number of times the job is executed, which is provided in the job type management table 21, is updated (step 111, and the job type management table 21 will be described in detail later).

If NO in step 104 or if the requested job cannot be executed at this point of time (NO in step 104), the job is stored in an unillustrated job stand-by queue (step 112), and the process awaits the transition of state of another job that is being executed.

As a result of the transition of state of the another job, such as completion of that job, the job stored in the job stand-by queue in step 112 is started to be subjected to the processing in step 103.

FIG. 6 is a flowchart of operations of the resource management section 3 performed when the resource management section 3 receives an event issued from the job control section 2.

When the resource management section 3 receives an event from the job control section 2 (step 201) and it turns out that the received event represents an inquiry event about whether or not the resources required for a newly requested job can be ensured (YES in step 202), the resource management section 3 searches data corresponding to the type of the requested job from the required-amount-of-resources management table 31 with reference to that table. Upon reference to the job constituent elements required for executing the corresponding type of job and the minimum amount of resources required by the job, a check is made as to whether or not the required amount of resources can be ensured at this point of time. Such a check can be made with reference to the resource management table 32, as shown in FIG. 7, within the resource management section 3.

The resource management table 32 shown in FIG. 7 manages the total capacity and the available capacity at this point of time for each resource.

The resource capacity corresponds to a value detected when the image forming apparatus 100 is powered and remains unchanged while the image forming apparatus 100 is powered. Further, the available capacity corresponds to a value obtained by subtraction of the total amount of resource used for executing a job in the image forming apparatus 100 from the resource capacity. The value is registered for each type of resource and is updated by the resource management section 3.

A job-in-progress ID represents an identifier of a job which is being executed through use of resources and the amount of resources used by the job. The value of the ID is also updated by the resource management section 3.

Next, the resource management section 3 compares the available capacity for each resource in the resource management table 32 with the minimum required amount of each job constituent element (or each resource) in the required-amount-of-resources management table 31 (step 204). If it is determined that the minimum amount of all the resources required by the job can be ensured at this point of time (YES in step 204), the minimum required amount of each resource is ensured for the requested job (step 205). Then, an OK event, or an event for the purpose of informing that the minimum amount of each resource required to execute the requested job is ensured, is issued toward the job control section 2 (step 206).

If the minimum required amount of resources for the requested job cannot be ensured, because resources are additionally allocated to another job that is being executed (additional allocation of resources will be described later) in step 204, the priority of the job that is being executed is compared with the priority of the requested job. If the requested job is prioritized higher than the job that is being executed, the additional allocation of resources to the job that is being executed is disabled, thus ensuring the amount of resources required for the requested job. The OK event serves as a criterion for the job control section 2 to judge whether or not the requested job can be executed. The decision is made in step 104 of the operation flow of the job control section 2. The resource management section 3 subtracts the amount of resources ensured for the requested job from the available capacity in the resource management table 32, thus updating the available capacity in the resource management table 32 (step 207).

In contrast, if the minimum required amount of resources cannot be ensured for the requested job with regard to one or more types of resources (NO in step 204), an NG event, or an event for the purpose of informing that the resources required to execute the requested job cannot be ensured, is issued toward the job control section 2 (step 208).

Further, if the event received in step 202 is not an inquiry event about whether or not the required amount of resources can be ensured for the job newly requested to be executed (NO in step 202), and if the event is an instruction event for additional allocation of resources (YES in step 209), a determination is made as to whether or not the amount of resources constituting the requested job can be additionally allocated to the requested job (step 210).

More specifically, with reference to the available capacity of resources in the resource management table 32, a determination is made as to whether or not the minimum required amount of resources in the required-amount-of-resources management table 31 with regard to each type of job can be additionally ensured. The unit of resources to be additionally allocated is taken as the unit of minimum required amount.

If it is determined that the amount of resources to be additionally allocated can be ensured (YES in step 210), the amount of resources are ensured for the requested job (step 211), and the resource management table 32 is updated (step 207).

On the other hand, if the amount of resources to be additionally allocated cannot be ensured in step 210 (NO in step 210), resources may be additionally allocated to another job that is being executed. Therefore, a check is made as to whether or not resources have been additionally allocated to the another job that is being executed (step 212). This check is made by checking the job-in-progress ID for each resource and the amount of the resource used by the job, which are provided in the resource management table 32 shown in FIG. 7. The resource management section 3 checks the type of job from the job-in-progress ID and checks the minimum amount of resource required by the job from the required-amount-of-resources management table 31. Through these checks, the resource management section 3 determines whether or not the resources have been additionally allocated to the job that is being executed.

If it is determined that resources are additionally allocated to the job that is being executed (YES in step 212), the additional allocation of resources to the job is disabled (step 213). The amount of resources disabled is determined on the basis of the proportion of additional allocation of resources calculated with regard to the job (in step 108 shown in FIG. 5). The amount of resources disabled is added to the available capacity in the resource management table 32, thus updating the amount of resources to be used for each job-in-progress ID. Subsequently, again in step 210, a determination is made as to whether or not the amount of resources to be additionally allocated to the requested job can be ensured. If resources for additional allocation cannot be ensured, the process repeatedly performs operations in steps 212 and 213. In contrast, if resources for additional allocation can be ensured (YES in step 210), the amount of resources to be additionally allocated is ensured for the requested job (step 211), and the resource management table 32 is updated with regard to the amount of resources thus ensured (step 207).

An image forming apparatus and a control method thereof according to a second embodiment of the present invention will now be described.

In the first embodiment, in a case where the proportion of resources to be additionally allocated to a job is calculated (see step 108 shown in FIG. 5), the job control section 2 decides the proportion of additional allocation on the basis of the fixedly determined priorities provided in the job type management able 21. In the second embodiment, an unillustrated job priority determination section is provided in the operation section 1, and the user can change the priority assigned to each job to a desired priority through manipulation of the job priority determination section. The changed value is issued toward the job control section 2 from the operation section 1.

As a result of addition, to the image forming apparatus, of the operation for changing the data regarding default priorities provided in the job type management table 21 shown in FIG. 8 to the values set by the user, the job control section 2 becomes able to increase the proportion of additional allocation of resources to a specific type of job designated by the user upon receipt of the foregoing event.

As a result, a desired job designated by the user can be executed in a prioritized manner. Further, even when another job is being executed, the designated job can be executed concurrently without suspending the job that is being executed at a speed faster than that at which the job is being executed.

Further, in a case where the method by which the user specifies job priority is changed according to a desired time period through use of the unillustrated job priority determination section provided in the operation section 1, the job control section 2, which has received from the operation section 1 an event for informing such a change in the method, newly registers the priority of each type of job provided in the job type management table 21 for each time period aside from default priorities.

In the example shown in FIG. 8, jobs related to facsimile transmission and reception are prioritized higher during nighttime hours after ten p.m. than those during daytime hours, and if the job control section 2 receives a job execution request event during the nighttime hours, the job control section 2 sets the amount of resources to be additionally allocated to the jobs related to facsimile transmission and reception greater than the amount of resources additionally allocated to the other jobs. As a result, even in the case where the frequency with which the user uses the image forming apparatus changes from time to time, the image forming apparatus can execute jobs in a relevant manner.

The priorities are changed by the user manipulating the unillustrated job priority determination section provided in the operation section 1. However, the priorities may be automatically changed through use of the job control section 2. As shown in FIG. 8, the number of times the job is executed is managed with regard to each type of job by the job control section 2 within the job type management table 21 (the numerical values regarding the number of times are updated in step 111 shown in FIG. 5). Therefore, for example, if the job control section 2 is arranged so as to automatically increase the priority of the job which is executed many times, as well as to reflect the change on the default priority, the job control section 2 can automatically change the job priority. As a result, it becomes unnecessary for the user to determine priorities in a trial-and-error manner through use of the unillustrated job priority determination section provided in the operation section 1. Since the proportion of additional allocation of resources is determined for each type of job according to the frequency of execution of the job, as required by the user, optimum job execution can be accomplished.

As described above, according to the present invention, the minimum amount of resources required to execute a job is managed for each type of job, and the amount of resources allocated to a job is dynamically changed according to the priority at the time of execution of the job.

Therefore, the concurrent-job-execution capability of the image forming apparatus can be adjusted. Even an image forming apparatus of the same type can be characterized according to the user's object of use of the apparatus, that is, a "copy-oriented MF machine", a "printer-oriented MF machine", or a "FAX-oriented MF machine", thereby greatly improving the user's operability of the apparatus.

Further, the proportion of allocation of resources is changed in response to a designation by the user or dynamically changed according to the history records about the execution of the job in the past or according to the time period, thus enabling the image forming apparatus to become able to flexibly cope with various needs from the users who share the apparatus. Thus, the operability of the image forming apparatus can be greatly improved.

What is claimed is:

1. An image forming apparatus for concurrently executing a plurality of types of jobs through use of shared resources, said apparatus comprising:

job control means for controlling execution of a job;

job priority means for determining priorities of jobs said job priority means changes the priorities of the jobs on the basis of a time of day; and resource management means for managing a state of use shared resources and allocating the shared resources required for executing the job in response to a request from said job control means when said job control means concurrently executes the jobs, wherein said resource management means includes a required resource management table fore storing a minimum amount of shared resources required for executing the job according to the type of the job, wherein at the time of allocation of the shared resources, the minimum amount of shared resources required for executing the job is allocated on the basis if the minimum amount of shared resources to be used, which is stored in said required resource management table.

2. The image forming apparatus as defined in claim 1, wherein when said job control means requires allocation of the shared resources in order to newly execute a second job during the execution of a first job, said resource management means allocates the shared resources to the second job on the basis of said required resource management table only when a minimum amount of shared resources required for executing the second job has been ensured, wherein said job control means executes the first and second jobs concurrently.

3. The image forming apparatus as defined in claim 1, wherein when there are unallocated shared resources during the execution of the job, said resource management means additionally allocates the shared resources to the job that is currently being executed, and when there are a plurality of jobs that are currently being executed, said resource management means additionally allocates the shared resource to the jobs in allocation proportions which vary from job to job, on the basis of preset priorities.

4. The image forming apparatus as defined in claim 3, further comprising job priority determination means for setting the priorities.

5. The image forming apparatus as defined in claim 3, wherein when the shared resources are additionally allocated, said resource management means changes the allocation proportion of the shared resources on the basis of a time at which the shared resources are additionally allocated.

6. The image forming apparatus as defined in claim 3, wherein when the shared resources are additionally allocated, said resource management means changes the allocation proportion of the shared resources on the basis of a past frequency of execution of the job to be additionally assigned the resource.

7. The image forming apparatus as defined in claim 1, wherein said job priority determination means changes the priorities of the jobs on the basis of past frequency of execution of the jobs.

8. A method of controlling an image forming apparatus for concurrently executing a plurality of types of jobs through use of shared resources, wherein shared resources required for executing a job are allocated at the time of execution of the job by management of state of use of the shared resources, and wherein a minimum amount of shared resources used and required for executing a job according to the type of the job is stored, and at the time of allocation of the shared resources, the minimum amount of shared resources required for executing the job is allocated to the job on the basis of the stored minimum amount of shared resources to be used.

9. The method as defined in claim 8, wherein during the execution of a first job, when a second job is newly executed, the shared resources are allocated to the second job on the basis of the stored minimum amount of shared resources to be used only when there is ensured the minimum amount of shared resources for executing the second job, and the first and second jobs are executed concurrently.

10. The method as defined in claim 8, wherein when there are unallocated shared resources during the execution of the job, the shared resources are allocated to the job that is currently being executed, and when a plurality of jobs are being executed, the shared resource are allocated to the jobs in allocation proportions which vary from job to job, on the basis of preset priorities.

11. The method as defined in claim 10, wherein the priorities are set by a user.

12. The method as defined in claim 10, wherein the allocation proportion is changed on the basis of a past frequency of execution of the job to be additionally allocated the shared resources.

* * * * *

UNITED STATES PATENT AND TRADEMARK OFFICE
CERTIFICATE OF CORRECTION

PATENT NO. : 6,678,065 B1
DATED : January 13, 2004
INVENTOR(S) : Yuji Hikawa

It is certified that error appears in the above-identified patent and that said Letters Patent is hereby corrected as shown below:

Column 11,
Line 44, "fore" should read -- for --.
Line 50, "if" should read -- of --.

Column 12,
Line 52, "resource" should read -- resources --.

Signed and Sealed this

Twenty-second Day of June, 2004

JON W. DUDAS
*Acting Director of the United States Patent and Trademark Office*